United States Patent [19]
Koitabashi

[11] Patent Number: 4,718,526
[45] Date of Patent: Jan. 12, 1988

[54] ELECTROMAGNETIC SPRING WOUND CLUTCH FOR A REFRIGERANT COMPRESSOR

[75] Inventor: Takatoshi Koitabashi, Annaka, Japan

[73] Assignee: Sanden Corporation, Gunma, Japan

[21] Appl. No.: 647,382

[22] Filed: Sep. 5, 1984

[30] Foreign Application Priority Data

Sep. 5, 1983 [JP] Japan ............... 58-137669[U]

[51] Int. Cl.⁴ ................. F16D 3/12; F16D 27/10
[52] U.S. Cl. ................... 192/35; 192/30 V; 192/84 C; 192/106.2; 464/89
[58] Field of Search ............ 192/35, 41 S, 81 C, 192/30 V, 106.1, 106.2, 84 C; 464/89

[56] References Cited

U.S. PATENT DOCUMENTS

| | | |
|---|---|---|
| 3,384,213 | 5/1968 | Bernard et al. ............... 192/84 C |
| 3,735,847 | 5/1973 | Brucken ......................... 192/35 |
| 3,752,279 | 8/1973 | Briar .............................. 192/106.1 |
| 3,774,739 | 11/1973 | Higuchi ......................... 192/106.1 |
| 3,831,723 | 8/1974 | Briar et al. .................... 192/35 |
| 3,865,222 | 2/1975 | Briar . |
| 4,273,226 | 6/1981 | Takefuta et al. ............. 192/35 |
| 4,445,606 | 5/1984 | Van Laningham ........... 192/106.1 |

*Primary Examiner*—George H. Krizmanich
*Attorney, Agent, or Firm*—Banner, Birch, McKie & Beckett

[57] ABSTRACT

An electromagnetic spring-wound clutch for a refrigerant compressor includes a coil-wound spring disposed around a pulley and having one end connected to an armature plate and cover plate. The cover plate is connected to a hub which is fixed on the outer end of the drive shaft of the refrigerant compressor through an elastic member. The elastic member is closely fitted in a polygonal-shaped air gap defined between the cover plate and hub. As a result, the impact force generated when the coil-wound spring is wound around the pulley during transmission of rotating motion is absorbed by the elastic member instead of the hub and drive shaft of the refrigerant compressor to thereby increase the life and durability of both the electromagnetic clutch and the refrigerant compressor.

5 Claims, 3 Drawing Figures

ELECTROMAGNETIC SPRING WOUND CLUTCH FOR A REFRIGERANT COMPRESSOR

BACKGROUND OF THE INVENTION

This invention relates generally to electromagnetic spring-wound clutches, such as for use in controlling the transmission of power from an automobile engine to a refrigerant compressor in an automobile air conditioning system, and more particularly, to an improved connecting structure between an armature plate and a hub for transferring the rotation of a pulley to the drive shaft of the compressor.

The general structure of a conventional electromagnetic spring-wound clutch for use between an automobile engine and an air conditioning compressor is disclosed in U.S. Pat. No. 3,735,847 and shown in FIG. 1. This electromagnetic spring-wound clutch includes pulley 1 rotatably supported on a tubular extension of a compressor housing through bearing 2, hub 3 fixed on the outer end of a drive shaft and armature plate 4 placed between pulley 1 and hub 3 facing the axial end surface of pulley 1 at a predetermined gap. Pulley 1 has axial flange 1a projecting outwardly in an axial direction from an axial end surface thereof. Coil-wound spring 5 is disposed around axial flange 1a of pulley 1 at a predetermined gap, and has its respective ends connected to armature plate 4 and hub 3. Electromagnetic coil 6 is coaxially disposed inside pulley 1 at a small gap for attracting armature plate 4 to pulley 1. When electromagnetic coil 6 is energized, the rotating motion of pulley 1 is transmitted to the drive shaft of the compressor by winding up or tightening coil-wound spring 5 on flange 1a, and when electromagnetic coil 6 is not energized, coil-wound spring 5 is unwound so that, while pulley 1 is rotated by the automobile engine, the compressor is not driven.

In the above construction, armature plate 4 is joined by the coil-wound spring to hub 3, which is fixed on the drive shaft of the compressor. As a result, an impact force occurs at the moment when armature plate 4 contacts the axial end surface of the pulley, which causes the coil-wound spring to wind around the axial flange of the pulley and begins to suddenly transmit rotational force. However, the rigid connection of the coil-wound spring between the armature plate and the hub does not cushion the impact force. The sudden torque change is directly transmitted to the hub and the drive shaft of the compressor. The repeated occurrence of this impact force can damage the portion of the electromagnetic clutch connecting the hub and drive shaft, and also can cause a shearing stress by twisting the drive shaft, which eventually may break the drive shaft. Thus, the occurrence of this force in conventional electromagnetic clutches reduces the endurance of the clutch and compressor.

SUMMARY OF THE INVENTION

It is a primary object of this invention to provide an improved electromagnetic spring-wound clutch which has a mechanism for easing the impact force transmitted to the drive shaft.

It is another object of this invention to provide an electromagnetic spring-wound clutch which has improved durability.

It is still another object of this invention to provide an electromagnetic spring-wound clutch that is simple in construction and easy to assemble.

The electromagnetic spring-wound clutch of the present invention includes a first rotatable member having an axial end plate formed of magnetic material and a second rotatable member coaxially disposed with respect to the first rotatable member. An armature plate is disposed coaxially with respect to the first rotatable member and is frictionally engageable with the first rotatable member. A coil-wound spring is positioned around the second rotatable member and has one end connected to the armature plate. A cover plate is connected to the second rotatable member through an elastic member. This cover plate covers the outer peripheral surface of the coil-wound spring and one end of the coil-wound spring is hooked thereon. An electromagnetic coil, which is associated with the first rotatable member, is provided for attracting the armature plate to the axial end of the first rotatable member so that the rotative motion of the first rotatable member is transmitted to the second rotatable member through the armature plate, the coil-wound spring and the cover plate.

A particular aspect of the present invention concerns a mechanism for easing the effect of the impact force which occurs upon engagement of the armature plate with the first rotatable member when the electromagnetic coil is energized. This mechanism includes the inner portion of the cover plate which has a polygonal-shaped bent portion. The second rotatable member or hub is provided with a similar shaped polygonal member facing the bent portion of the cover plate at a predetermined gap. An elastic member is closely fitted in the gap to elastically connect between the cover plate and the second rotatable member or hub. As a result, the rotative motion of the pulley is gradually transmitted to the second rotatable member or hub by the compression of the elastic member to thereby reduce the effect of the impact force and increase the life and durability of both the electromagnetic clutch and the compressor.

Further objects, features and other aspects of this invention will be understood from the detailed description of the preferred embodiment of this invention referring to the annexed drawings.

DETAILED DESCRIPTION OF THE PREFERRED EMBODIMENTS

Figure 1:
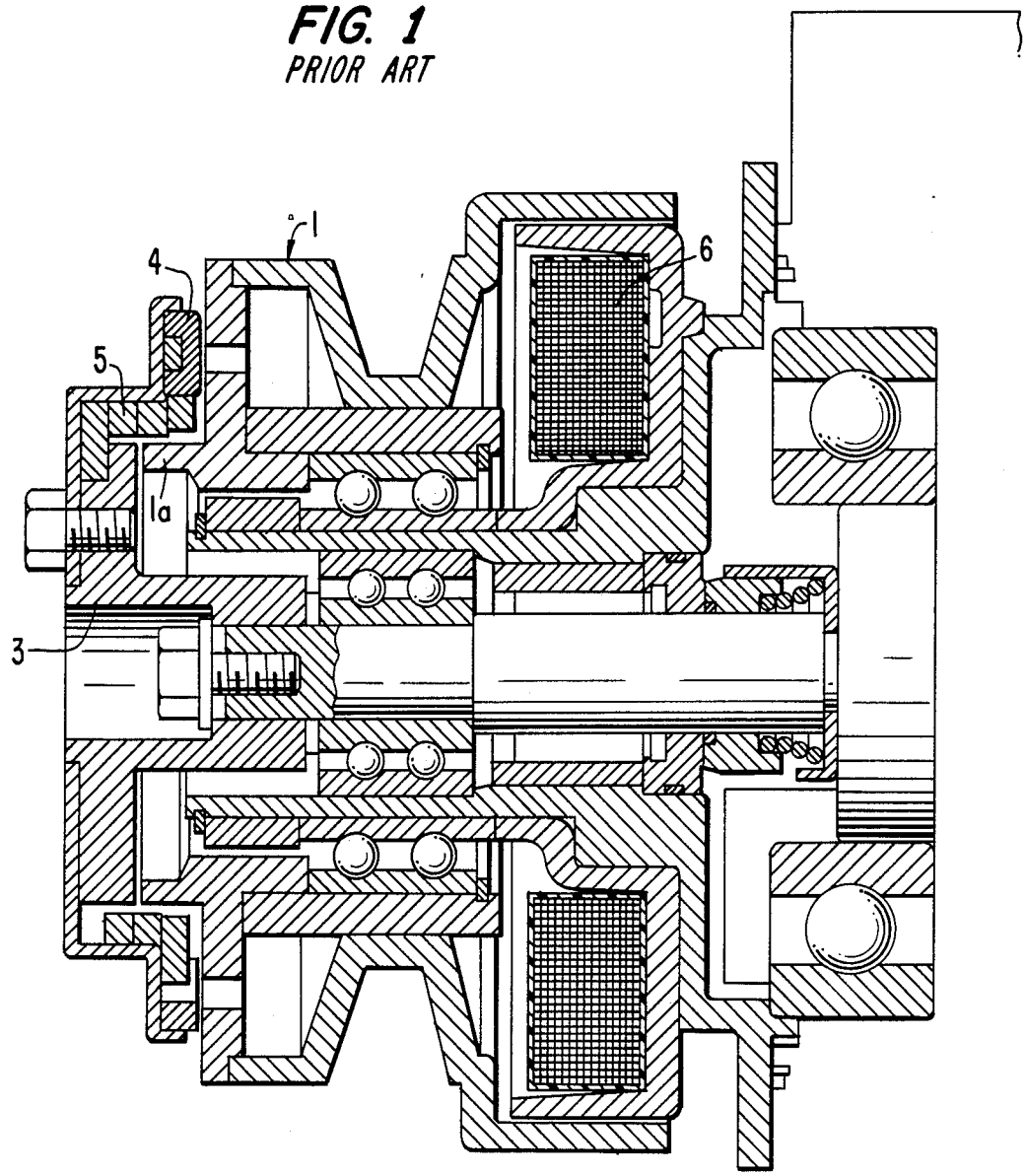
FIG. 1 is a vertical cross-sectional view of a conventional electromagnetic spring-wound clutch.
Figure 2:
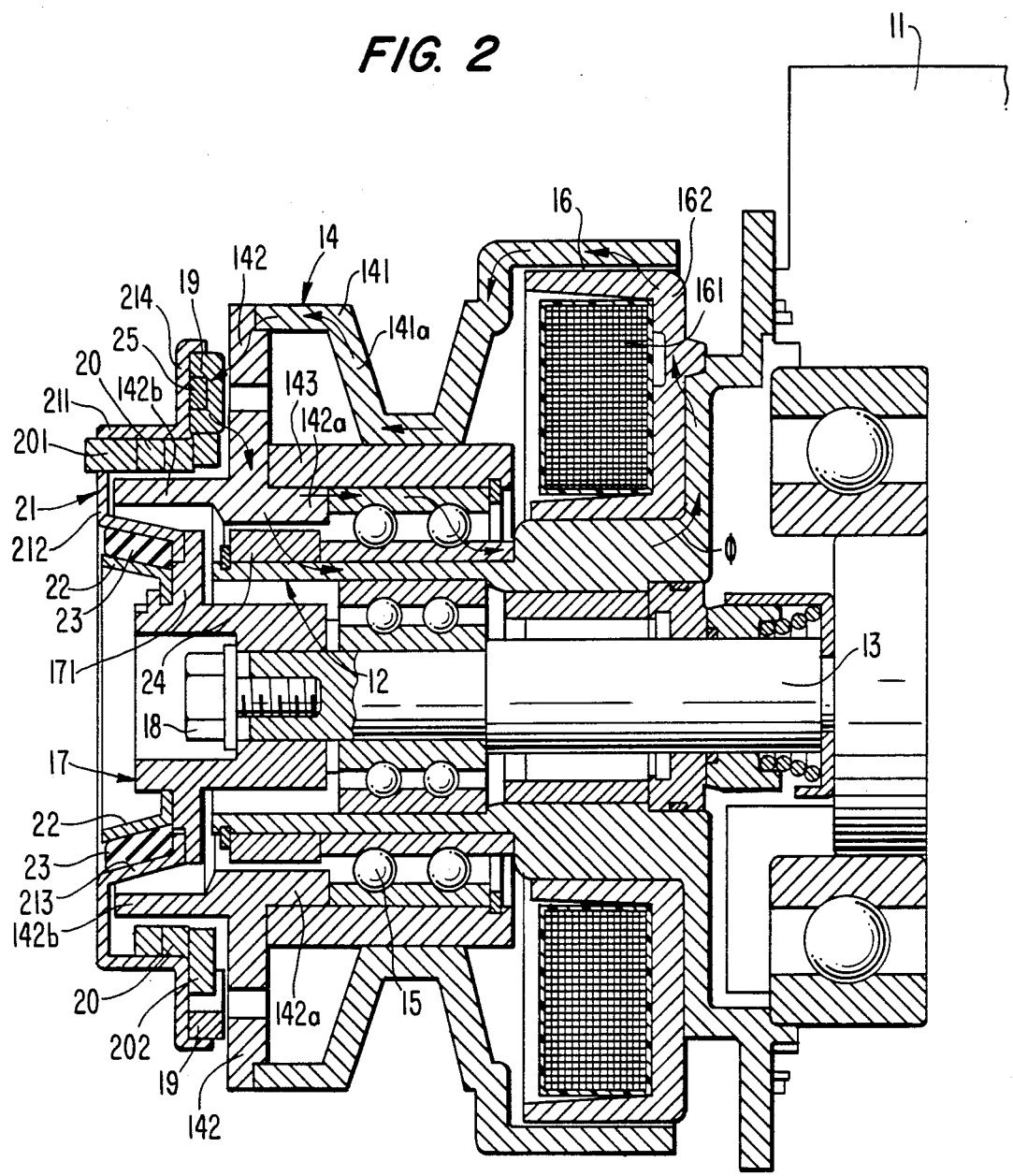
FIG. 2 is a vertical cross-sectional view of an electromagnetic spring-wound clutch according to one embodiment of the present invention.

Referring to FIG. 2, an electromagnetic spring-wound clutch according to one embodiment of this invention is shown assembled on a compressor for an automobile air conditioning system. Compressor housing 11 has a cantilevered tubular extension 12 surrounding drive shaft 13 of the compressor. Drive shaft 13 is rotatably supported in compressor housing 11 through two bearings as shown in FIG. 2.

Pulley 14, which has an axial end plate 142, is rotatably supported on tubular extension 12 by bearing 15 mounted on the outer peripheral surface of tubular extension 12. Electromagnetic device 16 includes magnetic coil 161 and coil housing 162, which is fastened on tubular extension 12 within an annular cavity of pulley 14. Hub 17, which has radial flange portion 171, is secured on the outer end of drive shaft 13 by bolt 18. A ring plate or armature plate 19 is concentrically disposed relative to hub 17. Armature plate 19, which faces axial end plate 142 of pulley 14 at a predetermined axial air gap, is movably connected to hub 17 through coil-wound spring 20 and spring cover 21. One end 201 of coil-wound spring 20 is hooked on cover plate 21 and the other end 202 is hooked on an inner surface of armature plate 19. Spring cover 21, which is connected to hub 17 through elastic member 23, is disposed on coil-wound spring 20 to cover the outer peripheral surface of coil-wound spring 20.

Pulley 14 comprises an outer cylindrical member 141, which has V-shaped groove 141a for receiving a V-belt in engagement with an automobile engine. Pulley 14 also includes axial end plate 142 extending radially inwardly from outer cylindrical member 141. The inner end of axial end plate 142 has inner extending axial flange 142a and outer extending axial flange 142b axially projecting therefrom in a T-shaped cross-section. Axial flanges 142a and 142b extend along spacer 24 disposed on tubular extension 12 at a small radial air gap to enlarge the area of magnetic flux. The outer peripheral surface of axial flange 142b faces the inner peripheral surface of coil-wound spring 20 with a gap therebetween. Annular shaped non-magnetic member 143 is placed between the inner peripheral surface of outer cylindrical member 141 and the outer race of bearing 15 for rotatably supporting pulley 14 on bearing 15 and for preventing leakage or short circuiting of magnetic flux through the open space of pulley 14. Non-magnetic member 143 is fixed on the inner peripheral surface of outer cylindrical member 141.

Figure 3:
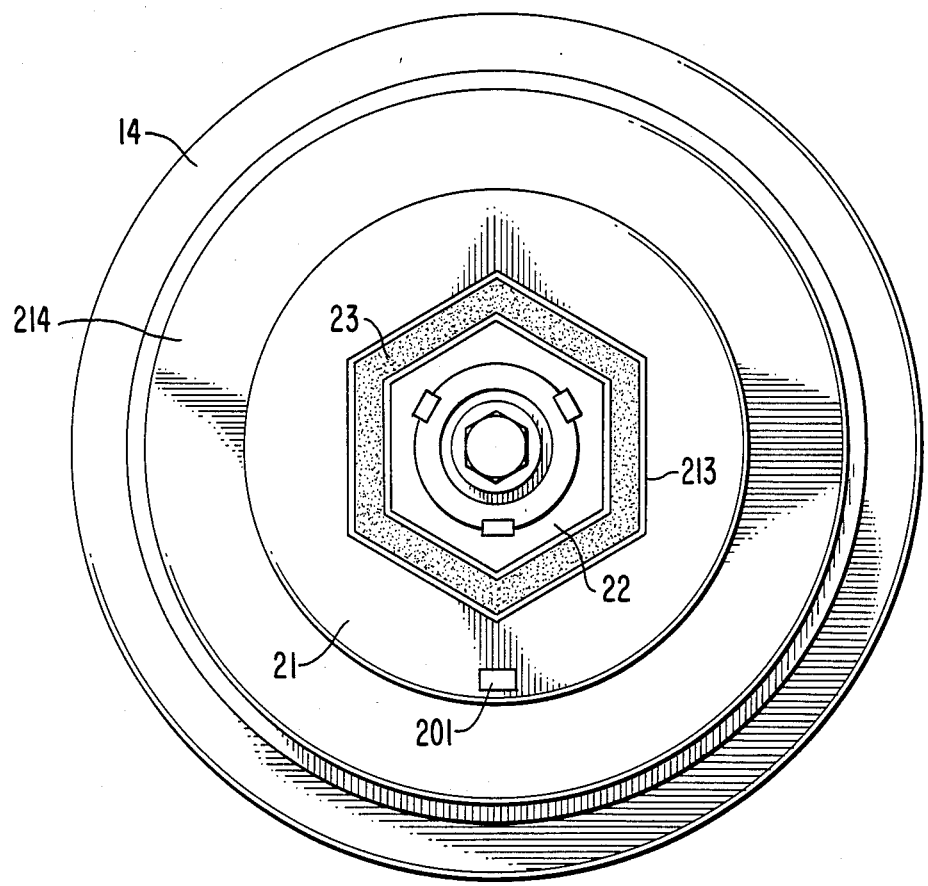
FIG. 3 is a front end view of the electromagnetic clutch shown in FIG. 2.

Spring cover 21 includes annular-shaped portion 211, which extends in an axial direction to cover the outer peripheral surface of coil-wound spring 20, and radial flange portion 212, which extends in a radially inward direction from the terminal end of annular-shaped portion 211 to cover part of axial end plate 142 of pulley 14. The inner end of radial flange portion 212 is bent inwardly to form hexagonal-shaped portion 213 as best illustrated in FIG. 3. Hexagonal-shaped member 22 is fixed on hub 17 to face each face of hexagonal-shaped portion 213 at a predetermined gap. The gap between hexagonal-shaped portion 213 of spring cover 21 and hexagonal-shaped member 22 is filled by annular elastic member 23 closely inserted therebetween.

Spring cover 21 also has second axial flange 214 extending radially outward from the end of annular-shaped portion 211 to cover one end surface of armature plate 19. Armature plate 19 has a plurality of permanent magnets 25 on one end surface facing spring cover 21. Therefore, armature plate 19 normally contacts second radial flange 214 of spring cover 21 due to the magnetic force of permanent magnets 25.

When coil 161 of electromagnetic device 16 is energized, magnetic flux ($\phi$) is produced and flows in a closed loop as indicated by the arrows in FIG. 2. This magnetic flux passes through outer cylindrical member 141 of pulley 14, axial end plate 142, armature plate 19 and end 202 of coil-wound spring 20. From end 202 of spring 20, magnetic flux passes through axial flanges 142a and 142b of pulley 14. The flow of magnetic flux then separates into two paths, as shown by the arrows in FIG. 2, one path passing through spacer 24 and tubular extension 12 and the other path passing through the inner and outer race of bearing 15 and tubular extension 12. Leakage or short circuiting of magnetic flux across outer cylindrical member 141 to flange 142a or the race of bearing 15 is prevented by non-magnetic member 143 of pulley 14.

Armature plate 19 is magnetically attracted to pulley 14 by the above-mentioned magnetic flux generated by the energization of coil 161. Armature plate 19 then rotates together with pulley 14. When armature plate 19 rotates together with pulley 14, one end 202 of coil-wound spring 20 rotates together with pulley 14 to wind coil-wound spring 20 into secure contact around the outer peripheral surface of outer axial flange 142b of pulley 14. Due to the winding of coil-wound spring 20, rotating motion of pulley 14 is transmitted to end 201 of coil-wound spring 20 hooked on cover plate 21. Therefore, rotating motion is transmitted to drive shaft 13 through coil-wound spring 20, cover plate 21, elastic member 23, hexagonal-shaped member 22 and hub 17.

When the rotating motion of pulley 14 is transmitted to cover plate 21, and from cover plate 21 to hexagonal-shaped member 23, elastic or rubber member 23 is compressed. As a result, the impact force caused by engagement of pulley 14 and armature plate 19 is absorbed by elastic member 23 rather than drive shaft 13 and hub 17. When coil 161 is deenergized, magnetic flux ($\phi$) is no longer produced so that armature plate 19 separates from axial end plate 142 of pulley 14 and is returned to its normal position against second flange portion 214 of spring cover 21 by the magnetic force of permanent magnets 25. Coil-wound spring 20 also unwinds from flange 142b to interrupt transmission of rotating motion from the automobile engine to drive shaft 13 of the compressor.

As mentioned above, coil-wound spring 20 is connected at its respective ends to armature plate 19 and spring cover 21, and the spring cover is connected to hub 17 through elastic member 23. Therefore, the impact force caused at the moment when the armature plate is frictionally engaged with the pulley is absorbed by the compression of the elastic member, which enhances the durability of both the electromagnetic clutch and the compressor. Also, since the elastic member is closely disposed in the hexagonal-shaped space defined between the spring cover and the hub, slippage of the elastic member, which could be caused by rotation of the spring cover, can be prevented. Additionally, installation of the elastic member can be easily accomplished in the space defined by the hexagonal-shaped portions because elastic member 23 can be fixed in this space without use of any facing method.

The present invention has been described in detail in connection with the preferred embodiment. However, this preferred embodiment is merely an example and the invention is not restricted thereto. It will be understood by those skilled in the art from a reading of the specification that variations and modifications can be made within the scope of the present invention as defined by the appended claims.

What is claimed is:

1. In an electromagnetic spring-wound clutch comprising a first rotatable member having an axial end plate formed of magnetic material, a second rotatable member and an armature plate coaxially disposed with respect to said first rotatable member, said armature plate being coupled to said second rotatable member and frictionally engageable with said first rotatable member, a coil-wound spring positioned around said second rotatable member and connected at one end to said armature plate, a cover plate connected to the second end of said coil-wound spring and having a cylindrical portion to cover the outer peripheral surface of said coil-wound spring, an electromagnetic device associated with said first rotatable member to attract said armature plate to the axial end plate of said first rotatable member, the improvement comprising said cover plate having a polygonal-shaped bent portion at its inner end; said second rotatable member having a corresponding polygonal-shaped member facing said polygonal-shaped bent portion of said cover plate at a predetermined gap; and an elastic member placed between said polygonal-shaped bent portion of said cover plate and said corresponding polygonal-shaped member of said second rotatable member in the predetermined gap to absorb the impact force generated upon engagement of said armature plate with said first rotatable member.

2. The electromagnetic spring-wound clutch of claim 1 wherein said elastic member comprises an annular-shaped rubber element.

3. The electromagnetic spring-wound clutch of claim 2 wherein said elastic member is closely fitted in the predetermined gap.

4. The electromagnetic spring-wound clutch of claim 3 wherein a flange portion is formed on said polygonal-shaped member of said second rotatable member.

5. An electromagnetic spring-wound clutch comprising:

a first rotatable member having an axial end plate formed of magnetic material;

a second rotatable member coaxially disposed with respect to said first rotatable member;

an armature plate member coaxially disposed with respect to said first rotatable member and frictionally engageable with said first rotatable member;

a coil-wound spring positioned around said second rotatable member and connected at one end to said armature plate;

a cover plate connected to said second rotatable member and having a cylindrical portion to cover the outer peripheral surface of said coil-wound spring, one end of said coil-wound spring being hooked on said cover plate;

an electromagnetic device associated with said first rotatable member to attract said armature plate to the axial end plate of said first rotatable member;

a polygonal-shaped bent portion formed on an inner end of said cover plate and a corresponding polygonal-shaped member formed on said second rotatable member facing said polygonal-shaped bent portion of said cover plate at a predetermined gap; and an elastic member placed between said polygonal-shaped bent portion of said cover plate and said corresponding polygonal-shaped member of said second rotatable member in the predetermined gap to absorb the impact force generated upon engagement of said armature plate with said first rotatable member.

* * * * *